July 12, 1949.                P. H. TRICKEY                 2,476,073
                        TWO-VALUE CAPACITOR MOTOR
                          Filed May 2, 1947
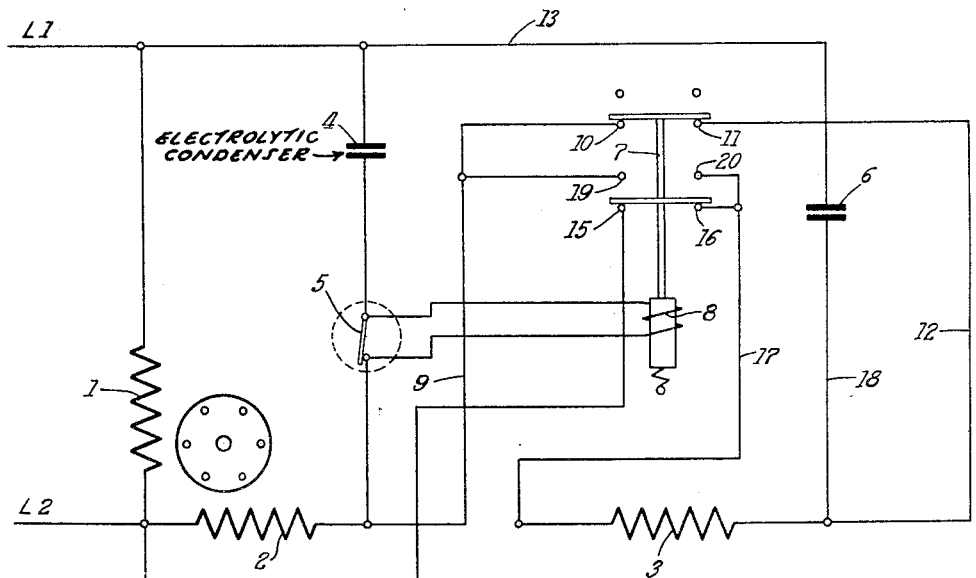
Fig. 1.
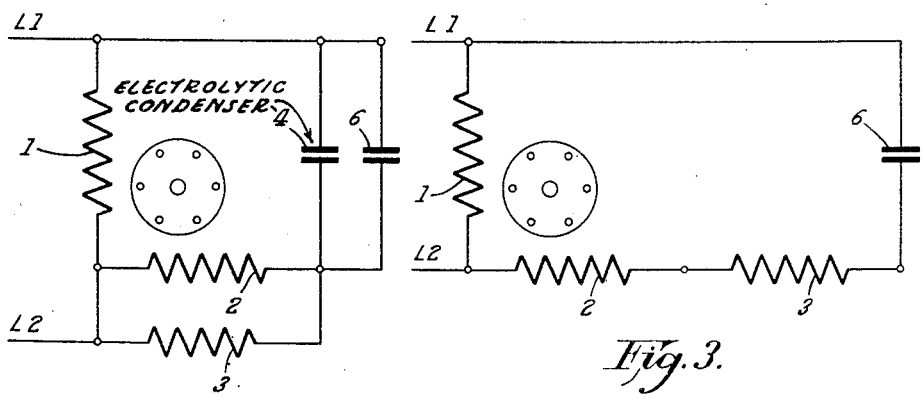
Fig. 2.                                         Fig. 3.
WITNESS:
William Martin Jr.
INVENTOR.
Philip H. Trickey
BY
William P. Stewart
ATTORNEY Patented July 12, 1949

2,476,073

UNITED STATES PATENT OFFICE 2,476,073

TWO-VALUE CAPACITOR MOTOR

Philip H. Trickey, North Plainfield, N. J., assignor to The Singer Manufacturing Company, Elizabeth, N. J., a corporation of New Jersey Application May 2, 1947, Serial No. 745,499

6 Claims. (Cl. 318—225)

This invention relates to electric motors, and more particularly to motors of the single-phase capacitor type, in which a different size and kind of capacitor is used for starting than for running.

The difficulty of making a capacitor motor which will provide optimum performance under both starting and running conditions has long been recognized.

In general, attempts to obtain a solution to this problem have resulted in switching arrangements which are too complicated to be practical or do not utilize all the motor windings at all times.

With the advent of the use of electrolytic condensers for starting and paper condensers for running, there arises the problem of adjusting the turn ratio of the windings to produce maximum volt amperes in each condenser consistent with the practical life of said condenser.

It is a primary object of this invention, therefore, to provide a two-value capacitor motor in which the optimum turn ratios for starting and for running are automatically selected and all the motor windings are utilized at all times.

This object is attained according to the invention by the use of a switching circuit which obtains full use of the capacitor winding both for starting and running, while, at the same time, allowing the use of the electrolytic starting condenser at a low winding ratio to insure a long working life therefor.

With the above and other objects in view, as will hereinafter appear, the invention comprises the devices, combinations and arrangement of parts hereinafter set forth and illustrated in the accompanying drawings of a preferred embodiment of the invention, from which the several features thereof and the advantages attained thereby will be readily understood by those skilled in the art.

Fig. 1 of the drawings is a diagrammatic illustration of a motor circuit embodying the invention.

Fig. 2 is a simplified schematic illustration showing only the primary connections when starting.

Fig. 3 is a simplified schematic illustration showing only the primary connections when running.

The motor illustrated is a single-phase induction motor having a main winding 1, connected across the supply terminals L1 and L2, and an auxiliary winding comprising two elements 2 and 3. As is well known in the art, windings 2 and 3 are wound on the same axis and in space phase quadrature with respect to the main winding 1. Preferably the winding elements 2 and 3 are identical and each contains substantially the same number of effective turns as does the main winding 1.

An electrolytic condenser 4 is connected in series with a switch 5, which is preferably of the centrifugal type, well known in the art of split-phase motors for cutting out a portion of the circuit upon the attainment of a predetermined motor speed.

A paper condenser 6 is connected from the line terminal L1 to one end of the winding 3. A double-pole, double-throw relay 7 has an operating coil 8 connected across the terminals of the switch 5. The relay 7, shown in its normal unexcited condition, which corresponds to the standstill condition of the motor with the switch 5 closed, has closed contacts 10, 11 and 15, 16; and open contacts 19, 20.

In this condition, a circuit may be traced from L2 through element 2, lead 9, relay contacts 10 and 11, lead 12, lead 18, condenser 6 and lead 13 to L1. A second circuit may be traced from L2 through lead 14, relay contacts 15 and 16, lead 17, element 3, lead 18, condenser 6, and lead 13 to L1. Further, it will be seen that a circuit may be traced from L2, through element 2, switch 5, condenser 4, to L1; also from L2, through lead 14, relay contacts 15 and 16, lead 17, winding element 3, lead 12, relay contacts 11 and 10, lead 9, switch 5, and condenser 4, to L1. Thus, under starting conditions, the winding elements 2 and 3 are mutually connected in parallel, as are the condensers 4 and 6, said parallel-connected pairs being connected in series across the supply lines L1 and L2, as shown in the simpler diagram of Fig. 2. This provides substantially a one-to-one ratio between effective main and auxiliary winding turns and thus provides a maximum voltage which is safe for the normally rated electrolytic condenser. Especially important is the fact that both elements of the auxiliary winding are utilized to carry current and the parallel connection thereof provides a lower impedance which helps in the production of increased starting torque.

When the motor has accelerated to a predetermined speed, the centrifugal switch 5 opens and the relay coil 8 is energized through the circuit containing condenser 4 and winding 2. Relay 7 picks up, thus opening contacts 15, 16 and 10, 11, and closing contacts 19, 20.

The relay coil 8 is of high impedance and thus does not permit much current to be drawn from the circuit containing the condenser 4. As far as effects on the motor are concerned, this circuit is open. With the closure of contacts 19 and 20, the following circuit is established: from L2 through winding 2, lead 9, contacts 19 and 20, lead 17, winding 3, lead 18, condenser 6, lead 13 to L1.

Thus, under running conditions, it will be seen that windings 2 and 3, together with condenser 6, are all connected in series across the line L1, L2, and condenser 4 is removed from the circuit, as shown in the simpler diagram of Fig. 3. This produces a ratio of auxiliary to main winding effective turns of approximately 2 to 1 thus providing adequate voltage on the paper condenser 6 to develop its maximum volt-ampere rating consistent with long life.

It will be understood that, while there is illustrated, in the preferred embodiment, a relay for accomplishing the required switching, this invention is not to be construed as so limited but includes within its scope any means for making the required circuit changes, including a manual switch or an additional two-pole, double-throw, cut-out switch.

The essential requirements are that the auxiliary winding sections are paralleled and are connected in series with the paralleled condensers and the line terminals at starting, while, during running, the auxiliary winding sections are series connected and placed in series with the paper condenser and the line terminals, the electrolytic condenser being disconnected from the circuit under the latter condition.

Having thus set forth the nature of the invention, what I claim herein is:

1. In a capacitor motor having line terminals, main and auxiliary windings disposed at a space angle to each other, said auxiliary winding comprising two paralleled sections, each section having substantially the same number of effective turns as the main winding, an electrolytic condenser, a paper condenser connected in parallel with said electrolytic condenser, said main winding being connected across said line terminals, said paralleled condensers forming a series circuit with the paralleled sections of said auxiliary winding and the line terminals, and means responsive to a condition of said motor for disconnecting the electrolytic condenser from the circuit and for simultaneously switching the two sections of the auxiliary winding from a parallel to a series relation.

2. In a capacitor motor having line terminals, a main winding, a two-section auxiliary winding, said main and auxiliary windings being disposed at a space angle to each other, an electrolytic condenser, a paper condenser, means for connecting said main winding across the line terminals, means for, at starting, connecting the auxiliary winding sections in parallel with each other and in series with a paralleled connection of said electrolytic and paper condensers and in series with the line terminals, and, during running, for connecting said auxiliary winding sections in series with each other, and means for simultaneously opening the circuit to the electrolytic condenser during running.

3. In a capacitor motor having line terminals, a main winding, a two-section auxiliary winding, said main and auxiliary windings being disposed at a space angle to each other, an electrolytic condenser, a paper condenser, means for connecting said main winding across the line terminals, means for, at starting, connecting the auxiliary winding sections in parallel with each other and in series with a paralleled connection of said electrolytic and paper condensers and in series with the line terminals and means responsive to a motor condition, for reconnecting said auxiliary winding sections from a parallel to a series relation with each other and for simultaneously disconnecting the electrolytic condenser from the circuit.

4. In a capacitor motor having line terminals, a main winding, a two section auxiliary winding, said main and auxiliary windings being disposed at a space angle to each other, an electrolytic condenser, a paper condenser, means for connecting said main winding across the line terminals, means for, at starting, connecting the auxiliary winding sections in parallel with each other and in series with a paralleled connection of said electrolytic and paper condensers and in series with the line terminals, and means responsive to a condition of said motor for changing the mutual parallel connection of said auxiliary winding sections to a series connection and for simultaneously disconnecting the electrolytic condenser from the motor circuit.

5. In a capacitor motor having line terminals, main and auxiliary windings disposed at a space angle to each other, said auxiliary winding comprising two paralleled sections, a starting condenser, a running condenser connected in parallel with said starting condenser, said main winding being connected across the line terminals, said paralleled condensers forming a series circuit with the paralleled sections of said auxiliary winding and the line terminals, and switch means for disconnecting the starting condenser from the circuit and for simultaneously switching the two sections of the auxiliary winding from a parallel to a series relation.

6. In a capacitor motor having line terminals, a main winding, a two-section auxiliary winding, said main and auxiliary windings being disposed at a space angle to each other, a large-valued starting condenser, a low-valued running condenser, means for connecting said main winding across the line terminals, means for, at starting, connecting the auxiliary winding sections in parallel with each other and in series with a paralleled connection of said condensers and in series with the line terminals, and, during running, for reconnecting said auxiliary winding sections in series with each other and means for simultaneously opening the circuit to the large-valued starting condenser during running.

PHILIP H. TRICKEY.

REFERENCES CITED

The following references are of record in the file of this patent:

UNITED STATES PATENTS

| Number | Name | Date |
|---|---|---|
| 1,886,895 | Meyers | Nov. 8, 1932 |
| 2,011,126 | Sprague | Aug. 13, 1935 |
| 2,243,070 | Cain | May 27, 1941 |
| 2,255,437 | Pearce | Sept. 9, 1941 |
| 2,280,971 | Packer | Apr. 28, 1942 |

FOREIGN PATENTS

| Number | Country | Date |
|---|---|---|
| 739,350 | France | Oct. 25, 1932 |
| 527,489 | Germany | June 18, 1931 |